UNITED STATES PATENT OFFICE.

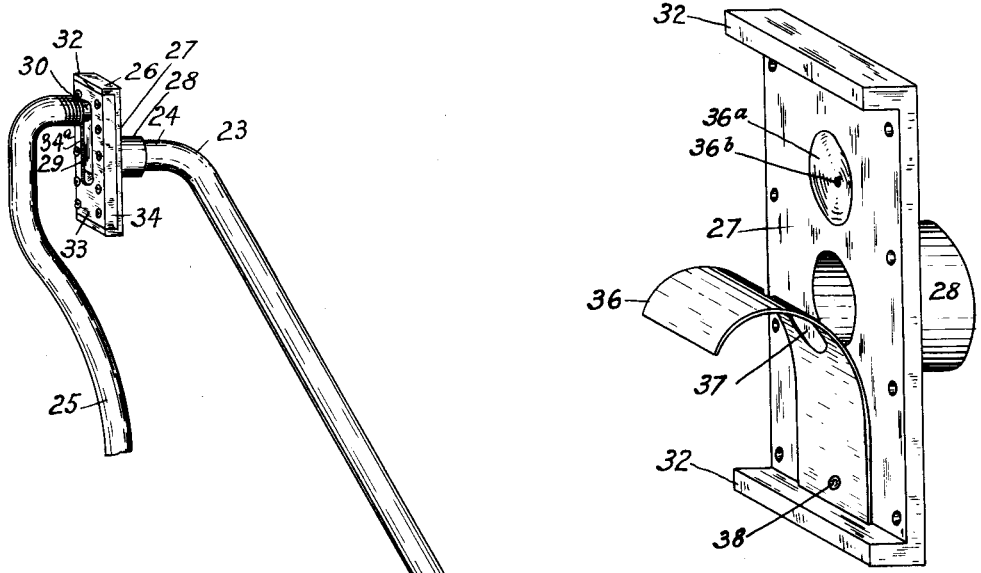

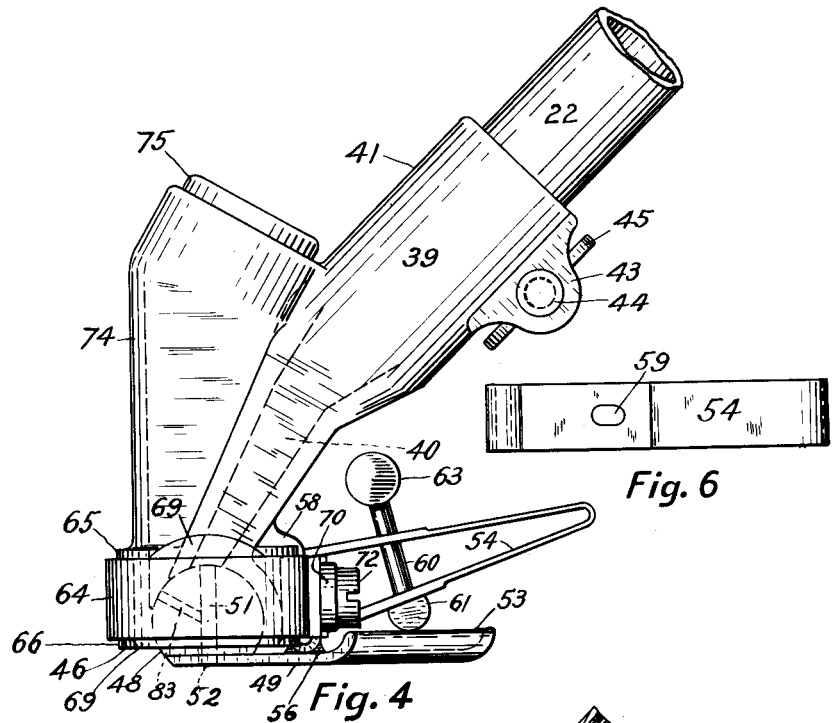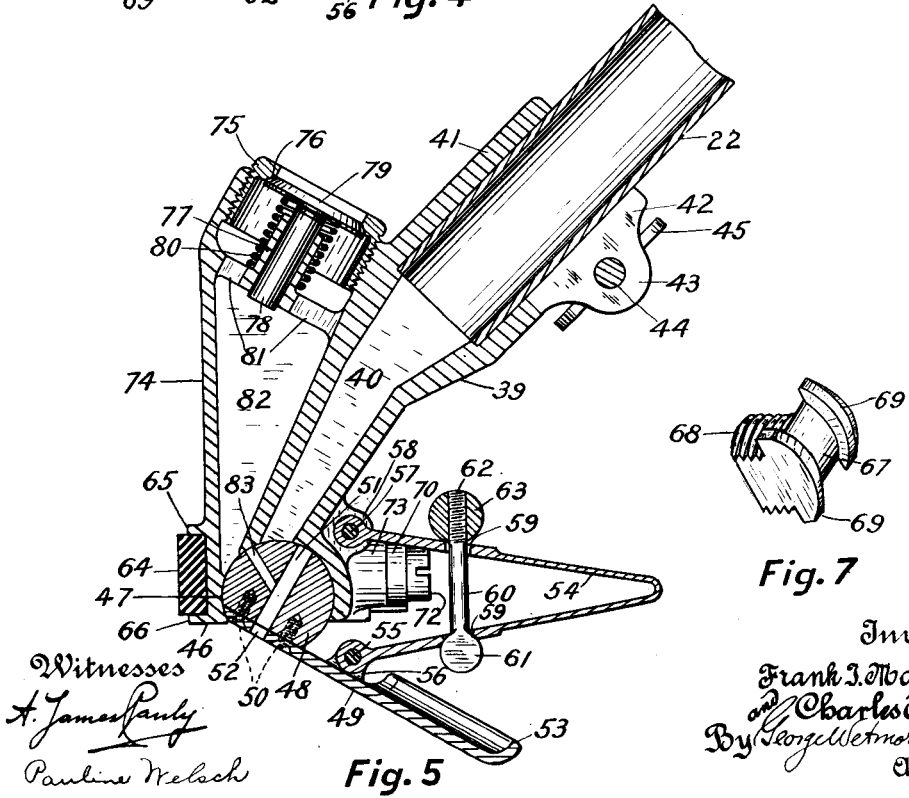

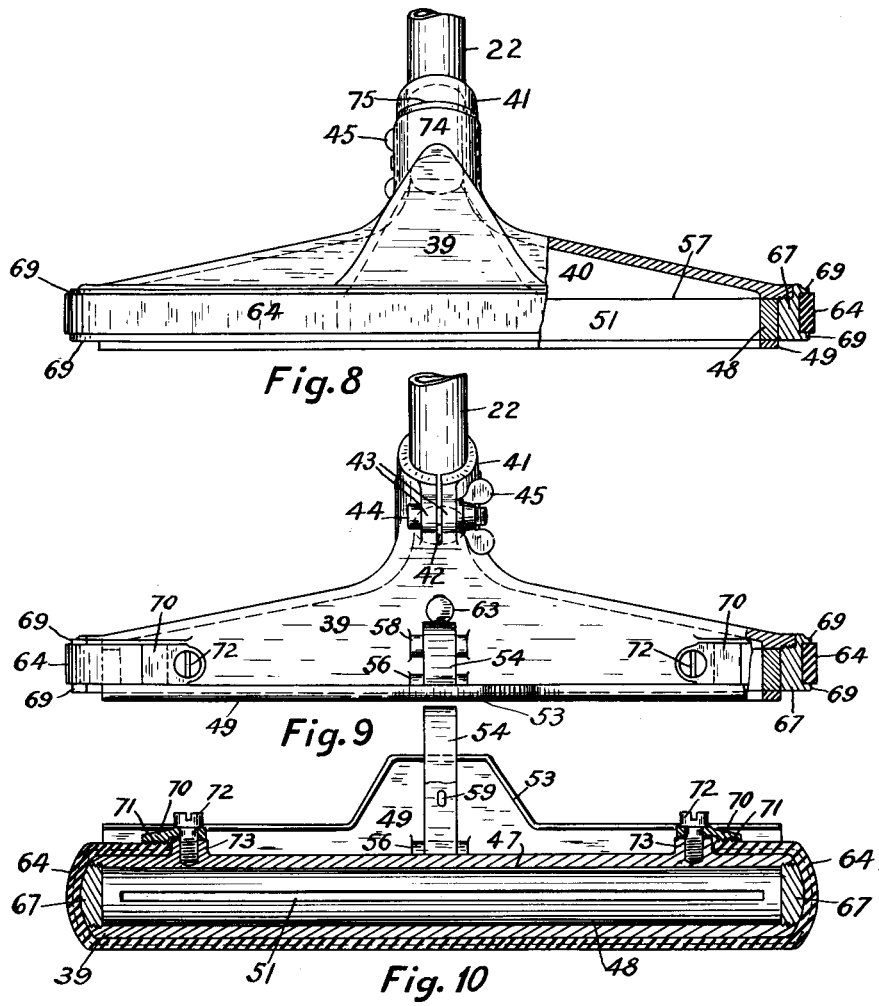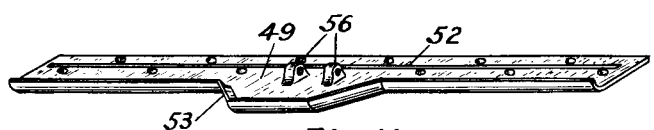

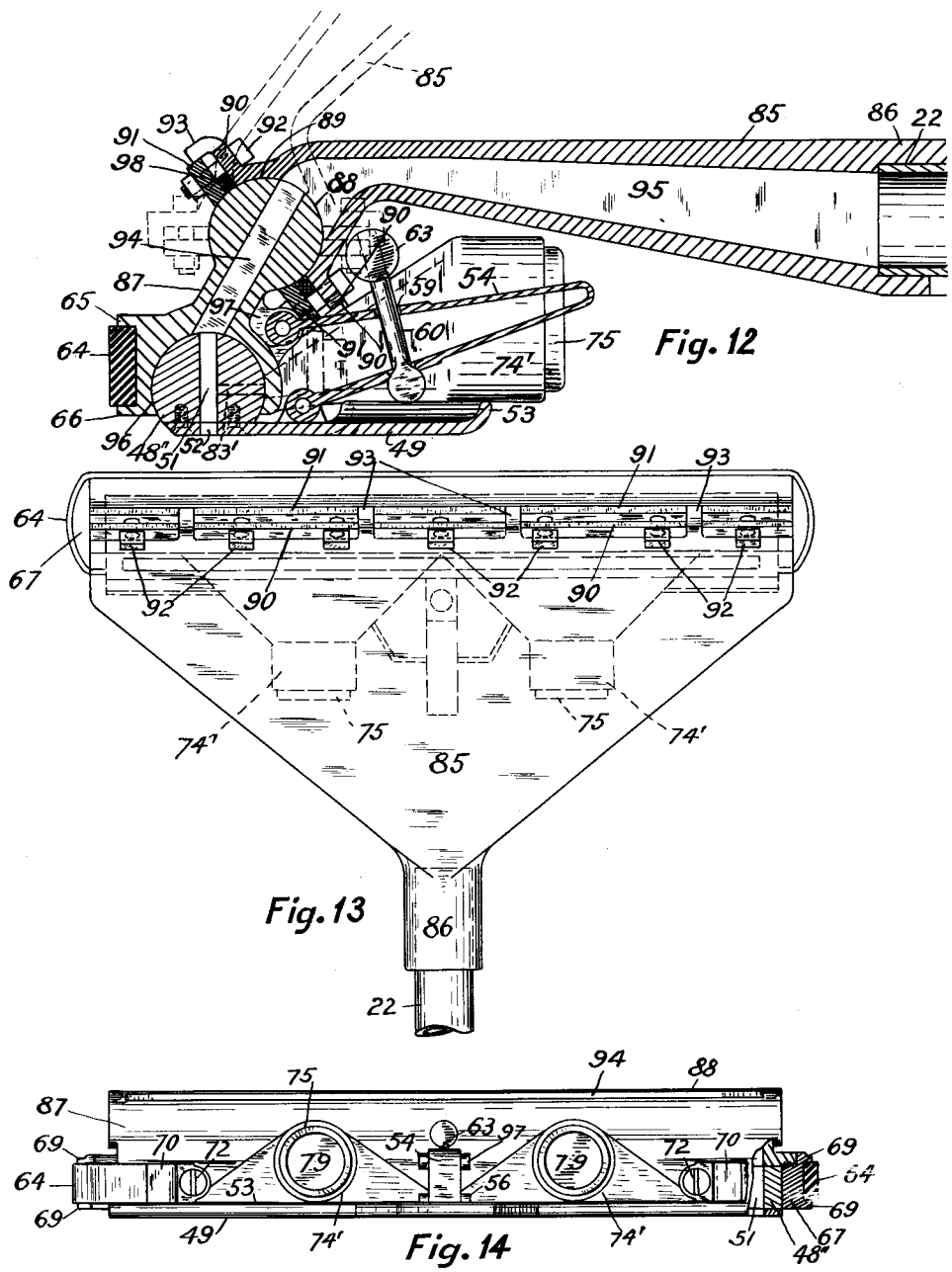

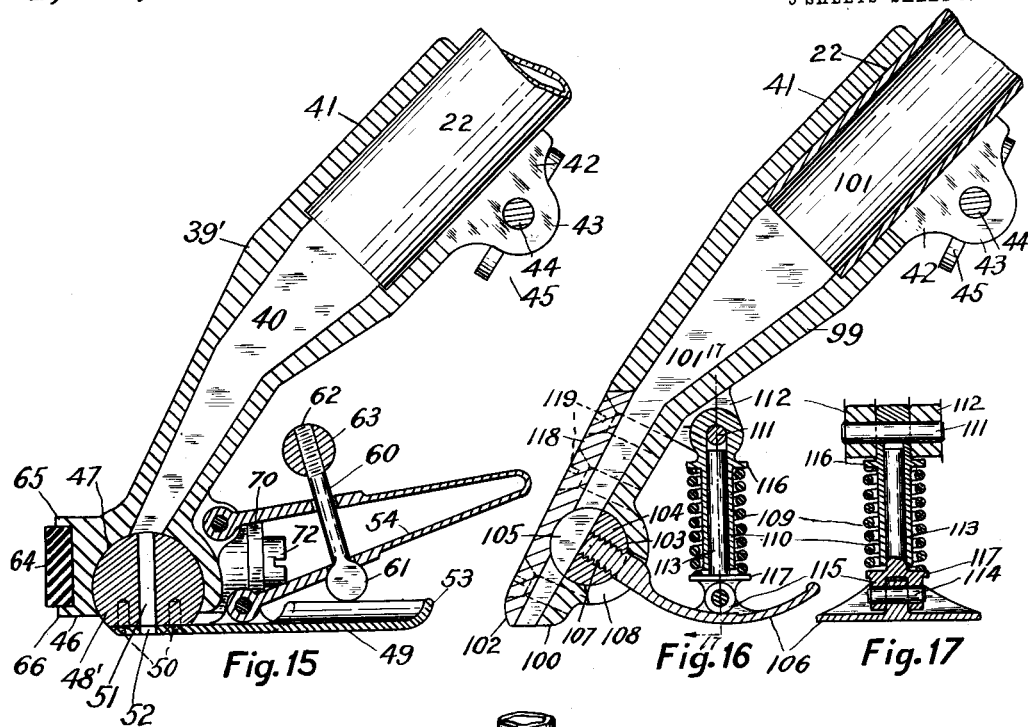
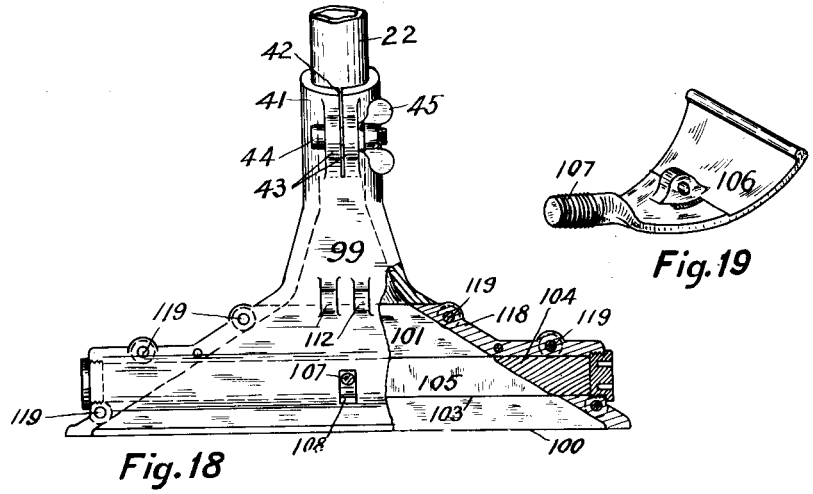

FRANK J. MATCHETTE AND CHARLES MOUKOS, OF MILWAUKEE, WISCONSIN, ASSIGNORS TO AMERICAN AIR CLEANING COMPANY, OF MILWAUKEE, WISCONSIN, A CORPORATION OF WISCONSIN.

CARPET-CLEANER.

1,055,771.      Specification of Letters Patent.     Patented Mar. 11, 1913.

Application filed December 30, 1904. Serial No. 238,880.

*To all whom it may concern:*

Be it known that we, FRANK J. MATCHETTE and CHARLES MOUKOS, both of Milwaukee, Wisconsin, have invented a Carpet-Cleaner, of which the following is a specification.

This invention relates to an apparatus for removing dust and dirt from carpets and the like, by what is known as the vacuum-air-system, that is to say, an apparatus having a tubulated nozzle, which, when applied to a carpet, floor, or article of furniture, or the like, draws up the dust and dirt by means of a current of air produced inwardly by suction.

The particular type of vacuum-apparatus here in question is a portable apparatus not itself provided with a straining means for the dust-laden air, but in which the tubular nozzle connects with a vacuum-hose delivering the sucked up air and dust to a dust collector, or straining system independent of the instrument itself.

In our present invention we have sought to improve this class of apparatus by introducing a number of novel features, the most important of which is a device for closing the nozzle automatically as soon as the cleaner is raised from the surface being cleaned, and opened again as soon as it is again brought into contact with said surface, whereby a great loss of power hitherto occasioned is obviated, and also a separate valve to be closed by hand is rendered unnecessary, although it may be applied if desired as herein provided.

A further important feature in connection with this device is the construction by which the opening of the nozzle is kept always in proper relation to the surface being cleaned, and is not dependent upon any fixed angle for the handle, so that the handle may change its angle with the cleaning surface to some extent, as is natural in the process of moving it back and forth over a floor, without affecting the efficiency of the device, and still always maintaining the nozzle-opening in proper relation with the floor.

Another novel feature of great importance in connection with this apparatus is the means for relieving the pressure at any moment when the vacuum within the nozzle becomes too great. It has been found in practice that the nozzle of such apparatus will occasionally stick to the carpet in such manner as to make it difficult to pull loose therefrom and the carpet will be pulled out of shape on the floor by reason of the pressure upon it from below in case the vacuum is great and there is no escape of air between the carpet and the nozzle. This feature of our apparatus prevents any such sticking to the carpet. When this automatic relief-device is used in connection with the aforesaid automatic cut-off it will ordinarily be so connected therewith that it is shut off from the nozzle at the same time the nozzle-opening is closed.

Another feature of the invention is in the improved construction of knuckle or cylinder-joint nozzle which enables the nozzle opening to be put into a position nearly at right angles with the handle, and thus push the nozzle of the instrument under objects such as radiators, sofas, book-cases and the like which leave narrow spaces between them and the floor, while at the same time, keeping the nozzle in proper position for taking up the dust.

Another feature of our invention is the buffer-band of resilient material, so arranged as to prevent the marring or scratching of wood-work when the instrument comes in contact therewith, and the means for attaching said buffer-band to the instrument.

Other features of our invention reside in the particular constructions and combinations which are hereinafter described and pointed out in the claims.

In order to enable those skilled in the art, to fully understand our invention and its various modes of application, we have illustrated several forms thereof in the accompanying drawings; and herein, Figure 1 is a perspective view of one form of our carpet-cleaner complete. Fig. 2 is a perspective view of the base piece of the cut-off valve with the cover and sliding-piece thereof removed. Fig. 3 is a longitudinal central section of the valve in a vertical plane. Fig. 4 is a side elevation of the nozzle. Fig. 5 is a longitudinal central vertical section of the same. Fig. 6 is a plan view of a spring for the floor-plate. Fig. 7 is a perspective view of one of the end closures for the nozzle-piece. Figs. 8 and 9 are respectively a front and a rear elevation of the nozzle. Fig. 10 is a plan section through the axis of the nozzle-valve. Fig. 11 is a perspective view of the floor-plate used with this form of cleaner. Fig. 12 is a longitudinal section through a special form of cleaner embodying our cylinder joint, as aforesaid, for the purpose of cleaning under radiators and the like. Fig. 13 is a plan view of this form in the position shown in Fig. 12. Fig. 14 is a rear view of the same with the upper member removed. Fig. 15 is a longitudinal median section of another form of our cleaner similar to that of Fig. 5 but without a vacuum-relief valve. Fig. 16 is a similar view of another form of cleaner which is especially adapted for removing the dust from corners. Fig. 17 is a vertical median section through the spring thereof, on a plane at right angles to the plane of Fig. 16, and on the line 17 of that figure. Fig. 18 is a rear elevation of this form of cleaner partly in section. Fig. 19 is a perspective view of the floor-plate as used in this form of instrument.

The apparatus consists in the main of two parts, to wit: the nozzle-piece 39 and the handle-piece 22, which latter is ordinarily a plain tube having its upper end bent as at 23, to form a convenient handle 24, and for the greater convenience of applying the vacuum-hose 25. At any point of the handle-piece 22, but preferably at the upper end thereof, is located a hand cut-off valve 26. This valve, which forms one of the principal features of our invention, as aforesaid, comprises a base-piece 27 having a threaded boss 28, which screws onto the end of the handle 22, as shown in Fig. 1; and a sliding-piece 29, having a hose-nipple 30 adapted for the attachment of the hose 25. The flange 31 of the piece 30 slides against the face of the piece 27, which latter has at its ends abutment-flanges 32, which fix the limit of movement of the piece 29. A cover-piece 33, having lateral flanges 34, fits over the face of the piece 27 and incloses the flange 31 of the piece 29 and thereby holds it in position, said cover having a slot 34$^a$ therein through which passes the nipple 30. In its extreme lowest position, the opening 35 of the nipple 30 is in register with that of the boss 28, whereby air passes through the valve; but in the opposite position, shown in Figs. 1 and 3, it will be seen that the flow is cut off by the covering of the opening 35 by the face of the plate 27. Now in order to positively and completely close the opening 35, we insert between the bases 27 and 29, a thin copper plate 36, which has a certain amount of flexibility, and which the vacuum in the opening 35 causes to be drawn up tightly against the opening, thereby preventing any leakage therethrough. Said copper-plate has of course a hole 37 therethrough in register with the opening of the boss 28, and may be secured to the member 27 at one end either by brazing or in any other suitable manner, as by a rivet 38. When it is desired to turn on the air, the operator therefore, by taking hold of the hose, pulls the nipple 35 down; and when it is desired to shut it off, the nipple 35 is pushed up, as will be readily understood. To make the plate 36 more certain in its action, the base 27 is slightly recessed back of the plate, as at 36$^a$, to which air is admitted through a hole 36$^b$ passing through the base 27.

It is to be understood that while we have herein shown the base-piece 27 as attached to the cleaner-handle, and the other piece to the vacuum-hose, this is merely by way of convenience, as their positions might be changed. And furthermore, we do not limit ourselves to the material or particular form or mounting of the plate 36; and while we have referred to it as being preferably of sheet-copper, it might be made of rubber or any impervious material which is adapted to effectively plug and seal the opening in which the vacuum is produced; and moreover, it is not absolutely necessary that this piece should be in the form of a plate, so long as it permits the free motion of the sliding-piece upon the base.

The member constituting the nozzle piece of the cleaner, designated 39, comprises a flaring triangular chamber 40, at the upper end of which is formed a handle-socket 41, which is split at one side as at 42 (Figs. 5 and 9), having at this point lugs 43, in which is fitted a bolt 44 having on its threaded end a wing-nut 45. The handle-socket is so formed that the handle-end may readily be inserted and tightened up by means of the wing-nut; the adjacent surfaces of the socket and handle-end being turned to a truly cylindrical section, whereby to make a tight joint. At its lower end the nozzle-piece is flattened as shown at 46, and has a cylindrical bore 47 whose axis is just above the flattened surface 46, but as clearly shown, the bore intersects the surface 46 so that a terminal member in the form of a cylindrical valve 48 mounted therein projects below the surface 46. This terminal member or valve has also a segment of its periphery cut away, and to it is attached the front edge of a floor-plate 49 by means of screws 50. When the floor-plate is parallel to the surface 46 it projects to some distance below the latter, so that the surface 46 does not at any time touch the floor. The nozzle-valve 48 has a diametrical passageway 51 therethrough, which, when the floor-plate is parallel to the surface 46, that is to say, when it rests on the floor, as in the process of cleaning, occupies a vertical position, registering with the opening of the chamber 40 as shown in the dotted lines of Fig. 4; and the floor-plate 49 has also a narrow slot 52 therein, which registers with the passageway in the valve when mounted in place. The floor-plate, as shown in the perspective view, Fig. 11, has a rearward extension 53, and at this point there is attached thereto a bent plate-spring 54 by means of a pin 55 supported on lugs 56 formed on the floor-plate; and at its other end the spring 54 is fitted on a pin 57, mounted in lugs 58 on the nozzle-piece. The action of the spring 54 tends to spread apart the legs thereof, and to hold the floor-plate in the position shown in Fig. 5, in which the passageway 51 no longer registers with the chamber 40 and consequently the passage for air is shut off. When however, the instrument is put into service the butt or projection 53 of the floor-plate strikes against the floor and the plate is turned against the pressure of the spring until it occupies a position parallel therewith, as shown in Fig. 4. In order to limit the expansion of the spring, each leg thereof has a hole 59 therein, through which passes a pin 60, one end of which has a head 61 larger than the hole through which it passes, and the other end 62 of which is threaded to receive a spherical nut 63. The proper limiting position for the floor-plate will then be readily adjusted by means of the nut 63.

About the base of the nozzle-piece is a buffer-band 64 of resilient material, such as rubber or felt being secured between flanges 65 and 66, running around the front and ends of the nozzle-piece. The latter is open at one end to admit the valve 48 into its bore 47, and the valve is held in place by means of a closure-piece 67, shown in perspective in Fig. 7, said piece having a threaded boss 68, which engages in the end of the valve-bore (see Figs. 8, 9 and 10), and flanges 69, which receive the band 64 between them. Said band 64 passes around the ends of the cleaner and its ends are attached to the latter by means of clips 70 on the rear face; each clip having a serrated gripping surface 71, and being clamped by means of a screw 72, threaded into a boss 73 on the rear face of the nozzle-piece. In Figs. 8, 9, 10, and 14, we have shown both ends of the nozzle-piece member open and provided with closure-pieces 67, but it is only necessary that one of said ends be open through which to insert the valve 48 in its position.

On the front side of the nozzle piece member, in this embodiment of the invention, is formed a tubular lug 74, the upper end of which is open and threaded to receive a valve casing 75, provided with an internal valve-seat 76. Opposite the opening of the lug 74 is centrally mounted a tubular post 77 for the sliding-stem 78 of the valve-plug 79, which closes the opening in the casing 75, and is pressed thereagainst by a coiled spring 80 mounted on the post 77. The mountings of the post 77 are such as to leave apertures 81 on the sides thereof which communicate with the chamber 82 in the lug 74, and this latter is connected at its lower end by a secondary slot 83 in the valve-plug 48 with the passage 51 thereof, and so with the vacuum-chamber 40 when the valve-plug is in the position of Fig. 4, as shown by the dotted lines of that figure. But when the valve-plug is turned into the position shown in Fig. 5, communication between the chambers 82 and 40 is shut off. The spring 80 is of sufficient strength to maintain the valve 79 closed so long as the vacuum in the chamber 40 is not too great; but if the vacuum rises above its proper level, the external pressure on the valve 48 forces it inward, thus relieving the vacuum and preventing the cleaner from sticking to the carpet.

While we prefer to use this automatic relief-valve in most cases, it is not essential to the apparatus in all cases, and in Fig. 15 we have illustrated a modified form comprising a plain nozzle-piece member 39' provided with a valve-plug 48' which has no secondary passage 83 therein, and the other parts being the same as previously described.

In many cases it is important to have a nozzle-piece which is adapted to be thrust under objects such as radiators, which leave little space between them and the floor, in order to remove the dust therefrom; and for this purpose we prefer to use the nozzle-piece member shown in Figs. 12, 13 and 14. This nozzle-piece consists of a flaring base-piece 85 which has a tubular socket 86 for the handle, formed as above described in connection with the nozzle-piece 39, or otherwise; and an oscillating member 87, having the active parts mounted thereon, and being connected with the base 85 by a cylindrical boss 88, turning in a cylindrical socket 89 on the piece 85, which has flanges 90 coöperating with plates 91 which overlap the base of the cylindrical boss 88 and are clamped to the flanges 90 by the bolts 92. The flanges 90 are provided with overhanging lugs 93 at points along their length, which engage the edges of the plates 91 and hold them in position laterally. Through the center of the boss 88 extends the passageway 94 which connects with the chamber 95 of the base 85 in all positions of the joint. At the lower end of this passageway is formed a cylindrical bore 96 similar to the bore 47 as previously described, and in which is fitted the cylindrical terminal member or valve 48" provided with the floor-plate 49, spring 54 and other appurtenances as previously described; the stationary end of the spring 54 being mounted to oscillate in lugs 97 at the neck of the oscillating piece 87. In this case the relief-valve, instead of being placed on the front side of the apparatus, is placed at the rear; there being a pair of tubular lugs 74', one on each side of the spring 54, each provided with a valve-seating piece 75 and plug 79, all as previously described. In this case the terminal member or valve 48″ has two secondary passages 83′ upon the rear side of the main passage 51, communicating with the opening of the lugs 74′ when the instrument is in use, that is to say in the position shown in the drawings. When the instrument is to be pushed under an object, the joint will of course be adjusted as shown, so that the base-member 85 and the handle connected therewith occupy a horizontal position; but when it is desired to use the cleaner for ordinary use the position is adjusted so that the base-piece will extend upwardly (as indicated by the dotted lines, Fig. 12), it being intended that the bolts 92 shall be sufficiently loose to enable the piece 87 to be readily shifted and adjusted in position by the hand while at the same time being clamped tight enough to prevent free movement in its socket. In order to assure that there shall be no leakage through the joint between the pieces 85 and 87, we may provide packing strips 98 between the flanges 90 and 91.

In Figs. 16 to 19 we have shown a form of our invention which is especially adapted to cleaning in corners which cannot be got into by any of those forms previously described. This form comprises a nozzle-piece member 99 having a socket 41 similar to that already described; but said nozzle-piece 99 terminates in a nearly sharp edge 100. The chamber 101 thereof projects through the center of this edge; and the front wall of the nozzle-piece, here made as a removable plate 118, secured in place by screws 119, may be chamfered at the tip, as at 102, to enable the passageway 101 to reach closely into corners. In the nozzle-piece, at a point above the termination thereof, is formed a cylindrical bore 103, in which is mounted a cylindrical valve 104, having a segment thereof cut away, as at 105, to register with the passage 101 when the valve is in position for use. At the rear side of the valve 104 is attached the floor-plate 106, which has a threaded pin 107 screwed into a threaded hole in the valve, this pin moving in a slot 108 at the rear side of the nozzle-piece back of the passageway 101. The floor-plate 106 is preferably convex on its lower face, so as to enable it to slide easily over the floor. We have in this form also shown a modified means of turning the valve 104, comprising a helical spring 109 mounted on a tubular spindle 110, which oscillates upon a pin 111 fixed in lugs 112 on the back of the nozzle-piece. A pin 113 is similarly attached to the floor-plate by means of a cross-pin 114 mounted in the crosshead 115, and telescopes within the bore of the piece 110. The pieces 110 and 113 have each an abutment-flange 116 and 117, at their pivoted ends, against which the respective ends of the spring 109 abut; said spring acting to force the floor-plate to oscillate downwardly until the pin 107 thereof strikes against the lower end of the slot 108, and the valve-plug 104 closes the passageway 101. Of course, when the cleaner is in use, the floor-plate 106 will be pressed against the floor and take up the position shown in the drawing. Although this form of cleaner has no means for keeping its lower surface parallel with the floor, yet being very narrow at the tip it is not in great need of such means. No automatic relief valve is here provided; but a slight tipping of the cleaner will cause the chamfered edge 102 to be raised off the floor and permit a current of air to pass between it and the carpet, thus relieving any possible sticking of the instrument.

As we have herein already stated that the nozzle-valve of our cleaner renders a handle-valve largely unnecessary, it may be inquired why we use one in connection with a nozzle-piece having a valve. The reason for using the handle-valve is principally to enable our detachable nozzle-pieces to be removed and replaced or changed without destroying the vacuum in the system. It will be readily understood that were a handle-valve not present and the nozzle-piece removed, the air rushing in through the handle would immediately reduce the vacuum in the system to a low point so as to interfere with other operators working with other cleaners on the same system in different parts of the building.

Our invention primarily consists, therefore, not in the particular form of handle-valve 26 described (which is only one form that may be used) but in mounting a valve of any kind in the handle in connection with a detachable nozzle-piece. Even were the nozzle-piece not provided with a valve of its own, the handle-valve would be practically necessary with the detachable nozzle-piece where it is less necessary with a nozzle-piece that is not detachable, because the area of the slit in most ordinary nozzle-pieces is not sufficient even when entirely free to destroy the vacuum entirely. It is obvious that this construction may also be used in connection with compressed air-cleaners, although we have especially designed it for use with vacuum-cleaners. Moreover, we do not confine ourselves to the particular form of the valve 26, wherein the abutting surfaces are flat, for it will be obvious that they might be otherwise formed, while still maintaining the principle of the invention. It is to be observed also that in our preferred form of the cleaner, which embodies the floor-plate 49, this plate is shown as extending across the active side of the nozzle-valve, whereby to form a wear-plate which may be removed when worn out and replaced by another; but we do not limit ourselves to this form, as the plate 49 may be cast integral with the nozzle-valve 48, or otherwise secured thereto, and in this case the active side of the valve need not be flattened as shown, and we have used it without the flattened part to equally good advantage.

Our invention is therefore not limited to any of the specified forms described, but is capable of other embodiments and modifications which will readily suggest themselves to those skilled in the art to which it appertains; and we do not limit ourselves therefore to specific constructions further than is indicated by the scope of our claims.

Having thus described our invention, what we claim as new and desire to secure by Letters Patent is:

1. A pneumatic cleaner for carpets and the like comprising a nozzle-piece having an air-passageway therein, and a yielding terminal valve mounted on said nozzle-piece and having a passageway therein adapted to be maintained at a constant angle with a surface being cleaned, said nozzle-piece being movable at variable angles to said valve.

2. A pneumatic cleaner for carpets and the like comprising a tubular nozzle-piece, a yielding member mounted at the lower end of the nozzle-piece and including a valve having a passage-way therein adapted to be brought into communication with the interior of the nozzle-piece, said member extending at an inclination to the nozzle-piece when the valve is in a closed position, and means connected with said member for holding the passage-way of the valve at a constant angle with a surface being cleaned.

3. A pneumatic cleaner for carpets and the like comprising a tubular nozzle-piece, and a terminal valve mounted to oscillate thereon and having a flattened side projecting beyond the end of the nozzle-piece and a passageway therein leading from said flattened side to the interior chamber of said nozzle-piece.

4. A pneumatic cleaner for carpets and the like, comprising a tubular nozzle-piece, a terminal valve mounted to oscillate thereon and having a flattened side projecting beyond the end of the nozzle-piece and a passageway therein leading from said flattened side to the interior chamber of said nozzle-piece, and means for turning said terminal valve sufficiently to cut-off the passageway thereof from the chamber of said nozzle-piece when said nozzle-piece is raised from the surface to be cleaned.

5. In a pneumatic cleaner, the combination of a tubular nozzle piece, a terminal valve movably mounted thereon and having a passageway therein, connected with the chamber of said tubular nozzle-piece, and means for maintaining said terminal valve at a constant angle with a surface being cleaned in the various angular movements of the tubular nozzle.

6. In a pneumatic cleaner, a nozzle-piece having an air-passageway adapted to deliver a current of air to or from the surface being cleaned, a normally closed rotary valve to permit the passage of air in said passageway, and means disposed to contact with a surface being cleaned for causing the rotation of said valve when the cleaner is placed against a surface to be cleaned.

7. In a pneumatic cleaner, a tubular nozzle-piece adapted to be placed in proximity to a surface to be cleaned, and having an air-passageway leading through said nozzle-piece, a valve adapted to close said passageway, a member connected with said valve and extended laterally therefrom in position to receive the superimposed weight of the nozzle and rest on the surface being cleaned when the instrument is in use, and resilient means acting on said member to cause said valve to assume a closed position.

8. A pneumatic cleaner comprising a nozzle-piece having a tubular passageway therethrough, an oscillating valve mounted across the passageway in said nozzle-piece, means for yieldingly maintaining said valve in closed position, and means adapted to strike against the surface when the nozzle-piece is pressed thereagainst for opening said valve.

9. A pneumatic cleaner comprising a nozzle-piece having a tubular passageway therethrough, a cylindrical valve mounted in said nozzle-piece and having a passageway adapted to register with said tubular passageway when said valve is in open position, means for rotating said valve into open position operating by pressure against a surface to be cleaned, and means for yieldingly maintaining said valve in closed position.

10. A pneumatic cleaner comprising a tubular nozzle-piece, an oscillating cylindrical valve mounted in said nozzle-piece across the passageway thereof, a floor-plate connected with said cylindrical valve and adapted to rest against the surface to be cleaned, said valve being in open position when said floor-plate is resting against said surface, a spring acting to rotate said valve into closed position, and means for limiting the oscillation of said valve.

11. A pneumatic cleaner comprising a tubular nozzle-piece having a transverse bore at the terminus thereof, and an oscillating valve fitting in said bore and having a flat surface adapted to abut against the surface to be cleaned, and having also a passageway therein opening on said flat surface communicating with the interior chamber of said nozzle-piece.

12. A pneumatic cleaner comprising a tubular nozzle-piece having a transverse bore at the terminus thereof, an oscillating valve-fitting in said bore and having a flat surface adapted to abut against the surface to be cleaned and having also a passageway therein opening on said flat surface and communicating with the interior chamber of said nozzle-piece, means causing the valve to assume said position in which said flat surface rests upon the surface to be cleaned when pressed thereagainst, and means resiliently acting to turn said valve into closed position.

13. A pneumatic cleaner comprising a tubular nozzle-piece having a transverse bore at the terminus thereof, an oscillating valve fitting in said bore and having a flat surface on the side next to the surface to be cleaned and having also a passageway therein opening on said flat surface and communicating with the interior chamber of said nozzle-piece, a member connected to said valve and adapted to rest upon the surface being cleaned when said valve occupies its open position, and a spring acting upon said member to turn the valve into closed position.

14. A pneumatic cleaner comprising a tubular nozzle-piece having a transverse bore at the terminus thereof, an oscillating valve fitting in said bore and having a flat surface adapted to abut against the surface to be cleaned and having also a passageway therein opening on said flat surface and communicating with the interior chamber of said nozzle-piece, and a floor-plate secured to said valve for oscillating it.

15. A pneumatic cleaner comprising a tubular nozzle-piece having a transverse bore at the terminus thereof, a floor-plate carrying an oscillating valve fitting in said bore and having a flat surface toward the surface to be cleaned and having also a passageway therein opening on said flat surface and communicating with the interior chamber of said nozzle-piece, and a spring acting on said floor-plate to rotate said valve into closed position.

16. A pneumatic cleaner comprising a tubular nozzle-piece having a transverse bore in the end thereof, a cylindrical valve fitting in said bore and projecting beyond the end of said nozzle-piece and having a diametrical slot therethrough communicating with the interior of said nozzle-piece, a floor-plate secured at the lower side of said valve and having a slot therein registering with the slot in said valve, said floor-plate being adapted to rest on the surface to be cleaned, and a spring connected with the said floor-plate and said nozzle-piece and acting to rotate said floor-plate downwardly, whereby said valve is turned into closed position.

17. In a pneumatic cleaner, a nozzle-piece adapted to be placed against a surface to be cleaned, and formed with an air passageway, an automatic cut-off valve for opening and closing said passageway and means for automatically admitting air to said air-passageway when the vacuum therein becomes too great.

18. In a pneumatic cleaner, a nozzle-piece adapted to be placed against the surface to be cleaned, and formed with an air passageway, a normally closed oscillating valve mounted in said passageway, means for opening said valve operated by pressure against the surface to be cleaned, and an automatic relief-valve connected with said air-passageway.

19. A pneumatic cleaner comprising a nozzle-piece having a tubular passageway therein, an air-chamber adjacent to said air-passageway, an automatic relief-valve in said chamber, means for normally maintaining said passageway completely closed, and means operated by the surface to be cleaned when the cleaner is placed thereagainst for opening communication between said passageway, said chamber and said surface.

20. A pneumatic cleaner comprising a nozzle-piece having an air-passageway therethrough, a valve in said passage-way, a relief-valve, means for maintaining said first-named valve normally closed and means operated by contact with the surface to be cleaned for opening said first named valve and simultaneously bringing said relief-valve and said passage-way into operative connection with each other.

21. A pneumatic cleaner comprising a nozzle-piece having a tubular passageway, an air-chamber adjacent to said passageway, a relief valve in said air-chamber, and a valve located at the junction of said passageway and air-chamber next to the outer working surface of the cleaner and adapted to control communication between said passage-way, chamber and surface.

22. A pneumatic cleaner comprising a nozzle-piece having a tubular passageway terminating at the operative end thereof, an air-chamber adjacent to said passageway, an automatic relief-valve in said air-chamber, a valve interposed between said passageway, chamber and the operative surface of said cleaner and arranged to simultaneously open and close communication between said passageway, chamber and surface, means for normally maintaining said valve in position to shut off said communications, and means operated by contact with the surface to be cleaned when the instrument is in operative position for throwing said valve into position to open said communications.

23. A pneumatic cleaner comprising a nozzle-piece having an air-passageway therein terminating at the operative end thereof and having a cylindrical bore in its operative end, an air-chamber mounted on said nozzle-piece and having a connection with said bore and an aperture leading to the exterior, an inwardly opening spring-operated valve closing said aperture, a cylindrical valve-piece oscillating in said bore and having passageways therethrough connecting said air-passageway and said chamber with the outer working surface of the cleaner, means for normally holding said valve-piece in position to close said communications, and a member connected with said valve and adapted by contact with the surface to be cleaned to move it into position to open said communications.

24. A pneumatic cleaner comprising a nozzle-piece having an air-passageway therein terminating at the operative end thereof and having a cylindrical bore in said operative end, an air-chamber mounted on said nozzle-piece and having a connection with said bore and an aperture leading to the exterior, an inwardly opening spring-operated valve closing said aperture, a cylindrical valve-piece oscillating in said bore and having passageways therethrough connecting said air-passageway and said chamber with the outer working surface. of the cleaner, said valve having a flattened projecting side, a floor-plate secured to said flattened side and normally resting on the surface to be cleaned and so maintaining the valve in open position, and a spring acting on said floor-plate to rotate said valve into closed position.

25. A pneumatic cleaner for carpets and the like, comprising a tubular nozzle-piece, a terminal valve mounted to oscillate thereon and projecting beyond the end of the nozzle-piece and formed with a passageway leading from the face of its projecting portion to the interior chamber of said nozzle-piece, and means for turning said terminal valve sufficiently to cut-off the passageway thereof from the chamber of said nozzle-piece when said nozzle-piece is raised from the surface to be cleaned.

In testimony whereof we have hereunto set our hands this 20th day of December, 1904.

FRANK J. MATCHETTE.
CHARLES MOUKOS.

In presence of—
L. R. Fox,
Chas. E. Canright.